US010880843B1

(12) United States Patent
Marupaduga

(10) Patent No.: US 10,880,843 B1
(45) Date of Patent: Dec. 29, 2020

(54) SYSTEM AND METHODS FOR DYNAMIC AND SELECTIVE ANTENNA TRANSMISSION POWER MODIFICATIONS

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/807,637

(22) Filed: Mar. 3, 2020

(51) Int. Cl.
*H04W 4/00* (2018.01)
*H04B 7/00* (2006.01)
*H04W 52/26* (2009.01)
*H04W 76/15* (2018.01)
*H04W 24/08* (2009.01)
*H04W 76/30* (2018.01)
*H04W 84/04* (2009.01)
*H04W 88/06* (2009.01)

(52) U.S. Cl.
CPC ......... *H04W 52/265* (2013.01); *H04W 24/08* (2013.01); *H04W 76/15* (2018.02); *H04W 76/30* (2018.02); *H04W 84/042* (2013.01); *H04W 88/06* (2013.01)

(58) Field of Classification Search
None
See application file for complete search history.

(56) References Cited

U.S. PATENT DOCUMENTS

2013/0171983 A1* 7/2013 Zhang .................. H04W 28/08
455/422.1
2020/0045627 A1* 2/2020 Wolfe .................. H04B 7/0413

* cited by examiner

*Primary Examiner* — Erika A Washington

(57) ABSTRACT

A method, system, and medium are provided for optimizing an edge-user experience in a first access technology based on dynamic antenna power modifications. In embodiments, when a large volume of UE are located in a particular edge-region of a sector of a cell site, the power supplied to one or more corresponding antenna elements may be reduced or stopped in order to reduce the coverage area of the first access technology and cause a portion of the UE to shift to a second access technology at the cell site. By lowering the volume of UE that are located in a particular edge-region of a sector of a cell site, the remaining portion of the UE that are located in a particular edge-region of a sector of a cell site experience improved throughput.

19 Claims, 7 Drawing Sheets

SYSTEM AND METHODS FOR DYNAMIC AND SELECTIVE ANTENNA TRANSMISSION POWER MODIFICATIONS

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, an antenna array may be partitioned so that different elements in the antenna array may operate using different technologies. In some embodiments, this virtual configuration refers to the antenna array operating in a dual technology mode, or Evolved-Universal Terrestrial Radio Access-New Radio Dual Connectivity ("EN-DC") mode, based on a radio controlling antenna array. When operating in the dual technology mode, an antenna array may concurrently connect to and communicate with user equipment (UE) using at least two distinct wireless technologies. For example, when operating in the dual technology mode, the radio and antenna array of the base station may support a concurrent connection to UE capable of 5G and legacy UE that only supports non-5G technologies. Further, when operating in the dual technology mode, the radio and antenna array of the base station may concurrently provide service for Long Term Evolution (LTE) Evolved Node B (eNodeB) and 5th Generation (5G) Next Generation Node B (gNodeB) access technologies in a telecommunications network.

In some embodiments, the antenna elements in the antenna array may be managed and adjusted for each of the two or more access technologies by the radio of the base station. For example, one group of antenna elements associated with a first access technology may be adjusted independently from another group of antenna elements associated with a different access technology within the same antenna array. In this way, the radio and antenna array operating in the dual technology mode may implement changes for a first access technology independent of the operations of the second access technology.

For example, when the throughput experienced by UE is degraded, the transmission power of some portion of antenna elements dedicated to the first access technology may be changed. The remaining antenna elements associated with a second access technology at the antenna array may not be adjusted, in one example. The change in the transmission power of at least a portion of the antenna elements dedicated to the first access technology may be used to switch one or more of the UE from the first access technology to the second access technology, thereby improving and/or restoring the throughput UE that remains connected to some other portion of antenna elements dedicated to the first access technology.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
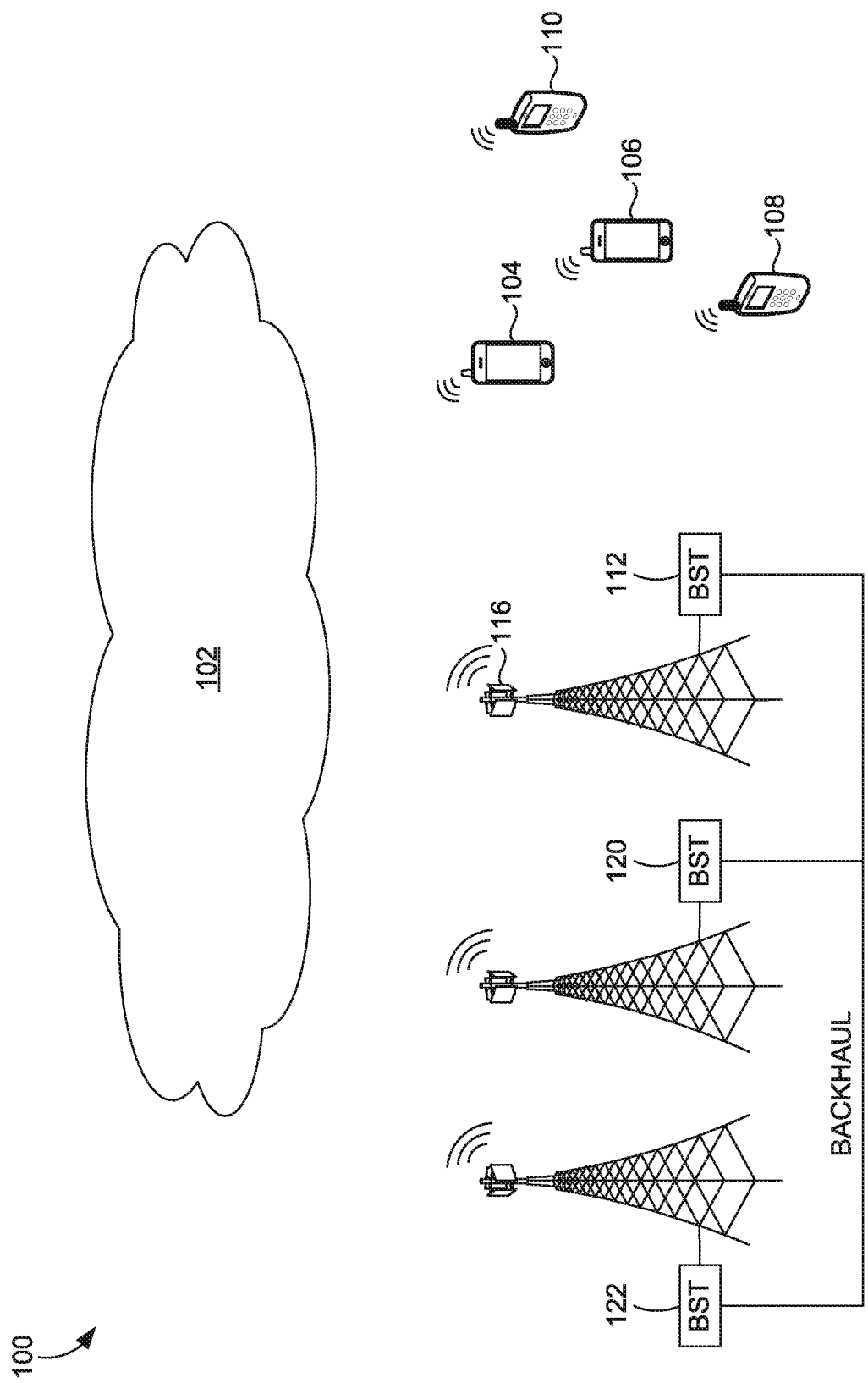
FIG. 1 depicts an example of a network environment in accordance with one or more embodiments.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
AAU Active Antenna Unit
BRS Broadband Radio Service
CD-ROM Compact Disk Read Only Memory
CDMA Code Division Multiple Access
EIRP Equivalent Isotropically Radiated Power
eNodeB Evolved Node B
EVDO Evolution-Data Optimized
GIS Geographic/Geographical/Geospatial Information System
gNB Next Generation Node B
gNB CU Next Generation Node B Central Unit
gNB DU Next Generation Node B Distribution Unit
GPRS General Packet Radio Service
GSM Global System for Mobile communications
iDEN Integrated Digital Enhanced Network
DVD Digital Versatile Discs
EEPROM Electrically Erasable Programmable Read Only Memory
FD-MIMO Full Dimension Multiple-Input Multiple-Output
LED Light Emitting Diode
LTE Long Term Evolution
MD Mobile Device
MIMO Multiple-Input Multiple-Output mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
RAM Random Access Memory
RET Remote Electrical Tilt
RF Radio-Frequency
RFI Radio-Frequency Interference
RLF Radio Link Failure
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SINR Signal-to-Interference-Plus-Noise Ratio
SNR Transmission-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Accordingly, the embodiments may take the form of a hardware embodiment, or an embodiment combining software and hardware. Some embodiments take the form of a computer-program product that includes computer-useable or computer-executable instructions embodied on one or more computer-readable media. Computer-readable media may comprise media implemented in any method or technology for storing information. Examples of stored information include computer-useable instructions, data structures, program modules, and other data representations.

"Computer-readable media" can be any available media and may include volatile and nonvolatile media, as well as removable and non-removable media. By way of example, and not limitation, computer-readable media may include computer storage media and communication media. "Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 700. Computer storage media does not comprise a signal per se.

"Communication media" typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment. The network may comprise one or more base stations, one or more cell sites (i.e., managed by a base station), one or more cell towers (i.e., having an antenna) associated with each base station or cell site, a gateway, a backhaul server that connects two or more base stations, a database, power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site with one cell tower, or alternatively, one base station may control multiple cell sites having multiple cell towers. As discussed herein, a base station is deployed in the network to broadcast, transmit, synchronize, and receive wireless signals in order to communicate with, verify, authenticate, and provide wireless communications service coverage to one or more user equipment that seeks to join and utilize the network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," "mobile device," and "wireless communication device" are used interchangeably to refer to a device employed by an end-user that communicates using a network. User equipment generally includes one or more antenna coupled to a radio for exchanging (e.g., transmitting and receiving) transmissions with a nearby base station, via an antenna array of the base station. In embodiments, user equipment may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. User equipment may include components such as software and hardware, a processor, a memory, a display component, a power supply or power source, a speaker, a touch-input component, a keyboard, and the like. In embodiments, some of the user equipment discussed herein may include current user equipment capable of using 5G and having backward compatibility with prior access technologies, current user equipment capable of using 5G and lacking backward compatibility with prior access technologies, and legacy user equipment that is not capable of using 5G.

The terms "radio," "controller," "antenna," and "antenna array" are used interchangeably to refer to one or more software and hardware components that facilitate sending and receiving wireless radio-frequency signals. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "dual technology" is used herein to indicate that at least two distinct technologies are available for concurrent utilization, for example, by a radio and corresponding antenna array. However, it will be understood from this discussion herein that radios that are capable of operating with more than two technologies are also contemplated to be within the scope of the invention and the term "dual" is not to be construed as specifically limiting the embodiments of the invention.

The term "mMIMO" may refer to one or more high element capacity antenna configurations, such as Full Dimension or Massive Multiple-Input Multiple-Output antenna configurations (interchangeably referred to as "FD MIMO" or "mMIMO"). In embodiments, mMIMO antenna arrays have a plurality of transmitting and receiving antenna elements that are, generally, physically arranged in a compact and high number configuration. In embodiments, the compact and dense configuration of the plurality of antenna elements within a single antenna may increase wireless network performance and throughput compared to prior, non-compact and/or low density antenna elements. For example of scale, a mMIMO antenna array may have approximately 64 to 128 individual antenna elements, though this is only an example and is not to be construed as limiting the number of antenna elements in any array. Additionally, for example, a mMIMO antenna array may generate a beam having a narrower beam width relative to a non-MIMO antenna array.

Generally, antenna arrays are located at an access point, cell site, and/or cell tower that is controlled by a base station. An antenna array may transmit and/or receive signals using one or more access technologies. For example, an antenna array may be configured with software that controls the hardware components and operation of the antenna array so that the antenna array operates using a 4G and/or 5G access technologies. In embodiments, an antenna array may be virtually partitioned into two or more distinct portions of antenna elements that utilize distinct access technologies (i.e., "dual technology" mode), and further, by adjusting the transmission power of at least some portion of elements for a corresponding access technology, in order to manage and optimize throughput for the corresponding access technology, in embodiments.

In embodiments, an antenna array is virtually partitioned so that a first portion of individual antenna elements operate using a first access technology and a second portion of individual antenna elements operate using a second access technology. In various embodiments, the antenna elements of the first and second portions may be controlled independent of each other. For example, the transmission power of the first portion of antenna elements may be increased or decreased independent of the transmission power of the second portion of antenna elements. Further, each antenna element may be individually controlled, in some embodiments. As such, the transmission power of a subset or a sub-portion of antenna elements within a first portion of antenna elements dedicated to the first access technology may be modified individually relative to a remainder of antenna elements in the first portion of antenna elements. In some embodiments, the transmission power of a subset or a sub-portion of antenna elements within a second portion of antenna elements dedicated to the second access technology may be modified individually relative to a remainder of antenna elements in the second portion of antenna elements.

In some embodiments, decreasing the transmission power of a subset of the first portion of antenna elements dedicated to the first access technology may proportionally decrease the signal strength and thus, may decrease the wireless transmission range or "coverage area" created by the subset of the first portion of the antenna elements. By decreasing the transmission power of the subset of the first portion of antenna elements dedicated to the first access technology at the antenna array, one or more user equipment (UE) that are connected to a network through that subset of antenna elements are forced to disconnect (i.e., by way of a loss of a coverage area for the first access technology) and switch to a connection at the same antenna array using one or more other antenna elements for which the transmission power was not reduced. The one or more other antenna elements may be dedicated to the second access technology, in some embodiments, such that the one or more UE become connected to the network via the second access technology instead of the first access technology.

In one example, by partially decreasing the transmission power or by completely stopping the transmission power (i.e., by powering off) of a subset of antenna elements of the first portion of antenna elements that are dedicated to the first access technology at the antenna array, the UE that were connected to the subset of antenna elements and which were connected to the network using the first access technology are forced off the first access technology and are forced to re-connect to the network using one or more other antenna elements at the same antenna array that are dedicated to the second access technology (i.e., other antenna elements for which the transmission power was not reduced). By forcing one or more UE to change from being connected to the network using the first access technology to being connected to the network using the second access technology, at the same antenna array, the quantity of UE that are connected to the network using the first access technology is reduced, in such embodiments. The reduction in the quantity of UE that are connected to the network using the first access technology is such that one or more other UE that remain connected to the network through the first access technology may experience improved throughput, in the example. Thus, when the measured and/or monitored throughput of UE connected to the network using the first access technology via the first portion of antenna elements at the antenna array is degraded, impaired, and/or is less than a threshold, for example, the quantity of UE connected to the network using the first access technology via the first portion of antenna elements at the antenna array can be reduced by powering down one or more of the antenna elements in the first portion of antenna elements that are dedicated to the first access technology. In the example, some portion of the UE are shifted from a connection via the first access technology to a connection via the second access technology, based on the reduction in the transmission power of one or more antenna elements, in some embodiments.

In yet another example, when a large number of UE (e.g., 100 UE) are connected to the network using 5G (e.g., a first access technology) at an EN-DC antenna array, the large number of UE may throttle the capacity and resource blocks provided by the antenna elements of the EN-DC antenna array that are allotted to and/or are dedicated to providing 5G service. Due to the large number of UE connected to 5G, some or all of the UE connected via 5G may experience impaired and/or degraded throughput, for example. In order to improve and/or restore desired throughput levels for UE that are connected to 5G service, for example, one or more of the large number of UE that are connected to the network using 5G at the EN-DC antenna array may be forced off of the 5G service and forced onto a non-5G service, such as 4G. By reducing the number of UE connected to 5G at the EN-DC antenna array, those UE that remain connected to the network using 5G at the EN-DC antenna array may experience improved and/or restored throughput levels.

Accordingly, embodiments discussed herein may "cap" the transmission power of one or more antenna elements that are dedicated to the first access technology in the antenna array that is operating in the dual technology mode. The transmission power may be capped by limiting the quantity of antenna elements concurrently radiating first access technology, in various embodiments. In further embodiments, the transmission power of antenna elements in the antenna array that are dedicated to the first access technology and that provide a coverage area to edge UE may specifically be capped. Thus, some quantity of edge-located UE may be switched from the first access technology to the second access technology by powering down a subset of antenna elements that provide first access technology coverage areas at the edge of the cell site served by the antenna array operating in a dual technology mode. Generally, the antenna elements in the antenna array that are dedicated to the second access technology are not modified, in various embodiments.

In one embodiment, a system is provided that optimizes an edge-user experience in a first access technology based on dynamic antenna power modifications. The system includes one or more hardware processors, in embodiments. The system may determine when a total quantity of a plurality of UE connected using a first access technology within a particular sector of one cell site at least meets a predefined quantity threshold, in embodiments. For each instance when the total quantity of the plurality of UE within the particular sector is determined to at least meet the predefined quantity threshold, the system may determine whether a throughput of the plurality of UE using the first access technology within the particular sector meets a predefined throughput threshold, in some embodiments. The system may also determine whether a service quality of a second access technology in the sector meets a predefined throughput threshold, in an embodiment. When the throughput determined is less than the predefined throughput threshold and the service quality meets the predefined throughput threshold, in embodiments, the system determines to shift at least one of the plurality of UE within the particular sector from the first access technology to the second access technology. The system, in some embodiments, identifies one or more antenna elements that correspond to the first access technology and that corresponds to the particular sector. In an embodiment, the system reduces the power supplied to at least one antenna element of the one or more antenna elements identified, wherein reducing the power supplied to the at least one antenna shifts at least one of the plurality of UE within the particular sector from the first access technology to the second access technology.

In another embodiment, a method is provided of optimizing an edge-user experience in a first access technology based on dynamic antenna power modifications. In embodiments, the throughput for a threshold-meeting quantity of UE at a cell site is determined to be less than a throughput threshold. When the throughput of the threshold quantity of UE is less than a throughput threshold, in some embodiments, a determination is made to shift one or more of the threshold-meeting quantity of UE from a first access technology to a second access technology. The power supplied to at least one of a plurality of antenna elements that correspond to the first access technology is reduced, in embodiments. Reducing the power supplied to the at least one antenna element causes at least one of the threshold-meeting quantity of UE to disconnect from the first access technology and to connect to the second access technology at the cell site, in some embodiments.

Embodiments herein comprise computer-readable storage media having computer-executable instructions embodied thereon that, when executed by one or more processors, cause the processors to determine when a total quantity of a plurality of UE that are connected to a first access technology and that are geographically located within a sector of a cell site at least meet a quantity threshold. Further, the throughput for the plurality of UE that are connected to a first access technology and that are geographically located within the sector is determined, in embodiments. In some embodiments, a service quality of a second access technology in the sector is determined to meet a quality threshold. When the throughput determined is less than a throughput threshold and when the service quality determined meets the quality threshold, a determination is made to shift one or more of the plurality of UE that are connected to the first access technology to the second access technology, in an embodiment. One or more antenna elements that are dedicated to the first access technology and that correspond to the sector of the cell site are identified, in embodiments. Then, in some embodiments, the power supplied to at least one antenna of the one or more antenna elements is identified, wherein reducing the power supplied to the at least one antenna causes at least one of the plurality of UE to connect using the second access technology.

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

Figure 3:
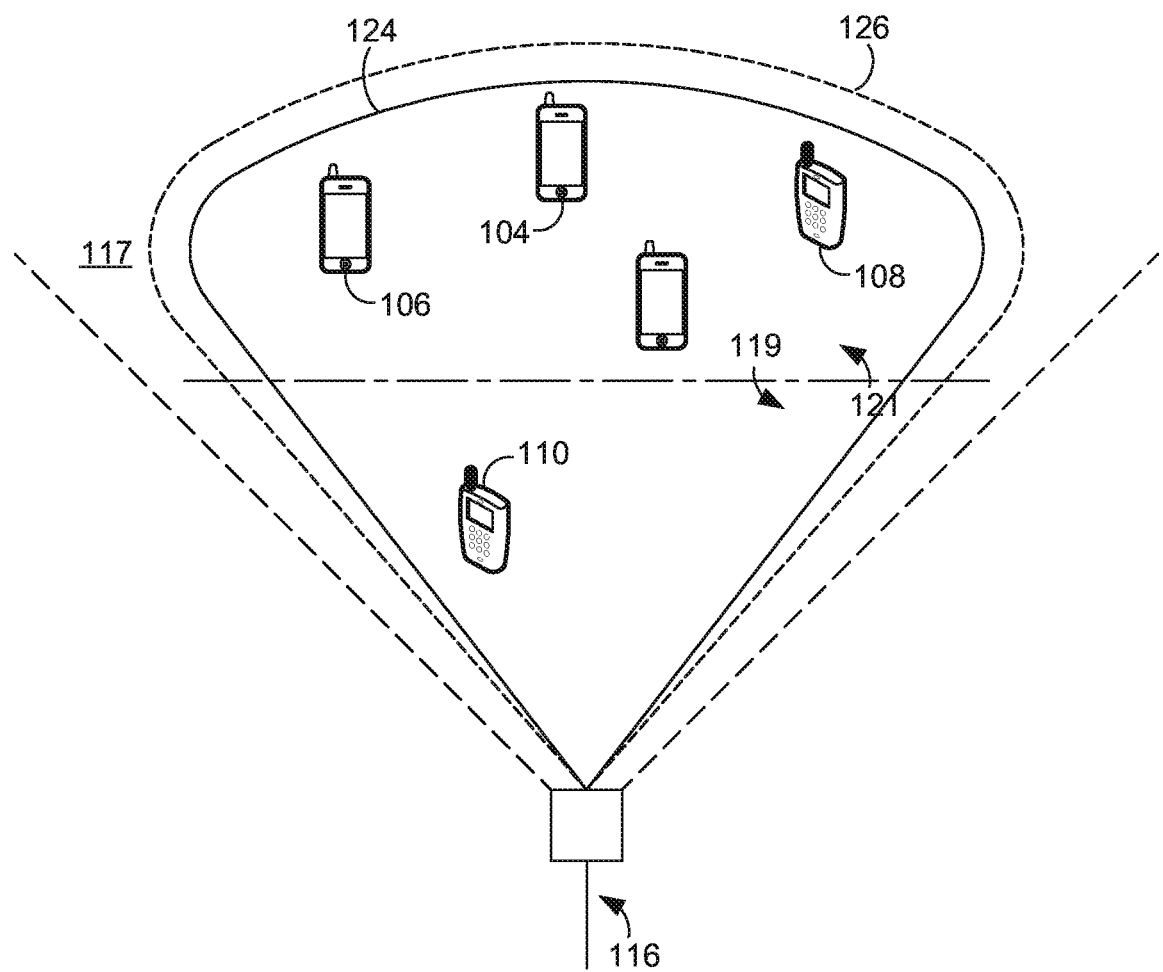
FIG. 3 depicts an example of coverage areas provided by an antenna array in accordance with one or more embodiments.

The antenna array 116 may radiate in a particular direction and thus may correspond to a particular sector of a cell site, such as sector 117 shown in FIG. 3. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit (MMU) for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE, and/or radio link failures that occur at the base station, dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include a first portion of antenna elements 118A and a second portion of antenna elements 118B, shown in FIG. 2. In embodiments, the plurality of antenna elements of the antenna array 116 may be partitioned so that a first portion of antenna elements 118A may be associated with, dedicated to, correspond to, and/or be configured to operate using a first access technology and a second portion of antenna elements 118B may be associated with, dedicated to, correspond to, and/or be configured to operate using a second access technology. In one embodiment, the plurality of antenna elements may be partitioned unequal groups or "split" into equal halves, wherein each group or half operates to provide a coverage area for a distinct access technology when the antenna array 116 operates in a dual technology mode.

In some embodiments, the antenna array 116 is partitioned so that the first portion of antenna elements 118A is associated with the first access technology and the second portion of antenna elements 118B is associated with the second access technology, and further, is partitioned so that a subset of the first portion of antenna elements 118A and a subset of the second portion of antenna elements 118B provide, at least partially, a coverage area to edge-located UE at the cell site. Additionally, in some embodiments, the antenna array 116 is partitioned so that the first portion of antenna elements 118A is associated with the first access technology and the second portion of antenna elements 118B is associated with the second access technology, and further, is partitioned so that a subset of the first portion of antenna elements 118A and a subset of the second portion of antenna elements 118B provide, at least partially, a coverage area to near-cell UE of the cell site. Accordingly, the antenna array 116 may provide first access technology and second access technology coverage areas to both near-cell UE and edge-located UE within the sector 117 to which the antenna array 116 corresponds at the cell site.

Figure 2:
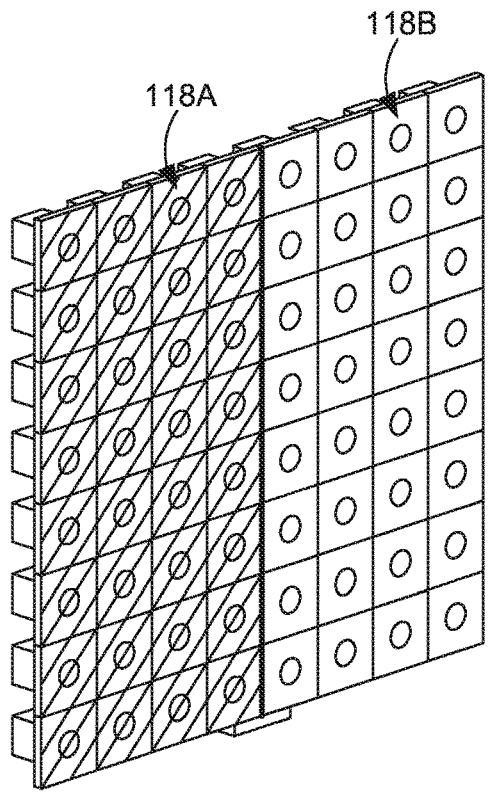
FIG. 2 depicts various first and second access technology antenna elements partitions of an antenna array in accordance with one or more embodiments.
Figure 2:
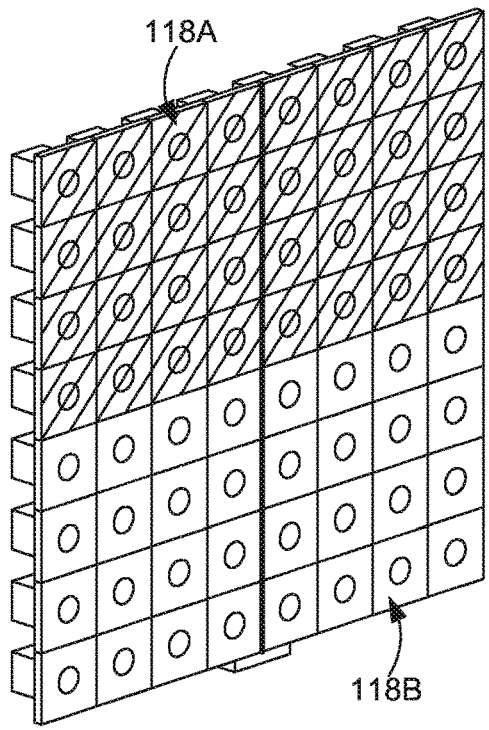
Figure 2:
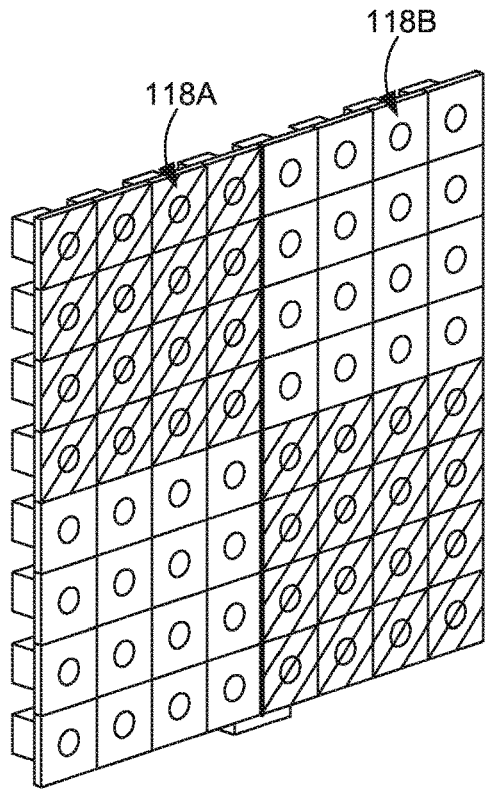
Figure 2:
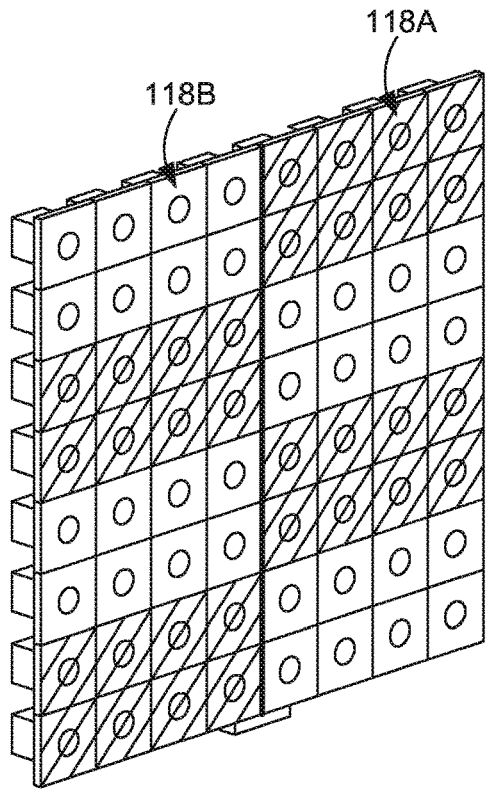

When the antenna array 116 is operating in a dual technology mode, each portion of the plurality of antenna elements may operate using only one distinct protocol and/or access technology relative to the other portions in the antenna array, in some embodiments. In one example, a first portion of antenna elements 118A may operate using 5G wireless access technology and the second portion of antenna elements 118B may operate using 4G wireless access technology. As illustrated in FIG. 2, for example, the plurality of antenna elements may be apportioned or virtually partitioned into the first and second portions 118A and 118B using a variety of configurations, and the embodiments herein are not limited to only those apportionments depicted, nor are the embodiments herein limited to balanced-array apportionments or specific ratios between various portions of the antenna array. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements 118A may communicate with current UE 104 and 106 using 5G technology and the second portion of the antenna elements 118B may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an Evolved Node B (i.e., "eNodeB" or "eNB") and a Next Generation Node B (i.e., "gNodeB" or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, radio link failures, and SINR levels at each of the neighboring base stations 120 and 122 may be communicated to the base station 112 via the X2 link, as discussed hereinafter. Additionally or alternatively, information regarding signal quality, radio link failures, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the signal transmission strength of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements 118A may be controlled and adjusted as a group by the base station 112 using a controller, such as an MMU, independent of the second portion of antenna elements 118B. In a similar fashion, the operations, configurations, and/or settings of the second portion of antenna elements 118B may be controlled and adjusted as a group by the base station 112 using the controller, independent of the first portion of antenna elements 118A. Accordingly, the base station 112 may use a controller to independently adjust different groups or portions of antenna elements within one antenna array.

Further, in embodiments, the operations, configurations, and/or settings of each individual antenna element of the first portion of antenna elements 118A and/or a subset of the first portion of antenna elements 118A may be controlled and adjusted by the base station 112 using a controller, such as an MMU, independent of a remainder of antenna elements in the first portion of antenna elements 118A and independent of the second portion of antenna elements 118B. For example, the operations, configurations, and/or settings of a first subset in the first portion of antenna elements 118A that correspond to an edge region of a cell site within a particular sector may be controlled and adjusted by the base station 112 using a controller, such as an MMU, independent of a remainder of antenna elements in the first portion of antenna elements 118A and independent of the second portion of antenna elements 118B. In one example, the operations, configurations, and/or settings of another subset in the first portion of antenna elements 118A that correspond to a near-cell region of a cell site within a particular sector may be controlled and adjusted by the base station 112 using a controller, such as an MMU, independent of a remainder of antenna elements in the first portion of antenna elements 118A and independent of the second portion of antenna elements 118B. FIG. 3 illustrates an example of a near-cell region 119 and an edge region 121 of the sector 117 of a cell site.

In a similar fashion, the operations, configurations, and/or settings of each individual antenna element of the second portion of antenna elements 118B and/or a subset of the second portion of antenna elements 118B may be controlled and adjusted by the base station 112 using the controller, independent of the first portion of antenna elements 118A. For example, the operations, configurations, and/or settings of a second subset in the second portion of antenna elements 118B that correspond to an edge region of a cell site within a particular sector may be controlled and adjusted by the base station 112 using a controller, such as an MMU, independent of a remainder of antenna elements in the second portion of antenna elements 118B and independent of the first portion of antenna elements 118A. In one example, the operations, configurations, and/or settings of a subset in the second portion of antenna elements 118B that correspond to a near-cell region of a cell site within a particular sector may be controlled and adjusted by the base station 112 using a controller, such as an MMU, independent of a remainder of antenna elements in the second portion of antenna elements 118B and independent of the first portion of antenna elements 118A.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or radio link failures. The base station 112 may use the controller to partially or completely reduce the power supplied to one or more individual antenna elements (e.g., one or more of the first portion of antenna elements 118A and/or one or more of the second portion of antenna elements 118B) in the antenna array 116 based on the measurements and/or monitoring.

For example, the base station 112 may monitor the quantity of UE that is connected to the network 102 at the base station 112 and throughput of UE that is connected to the network 102 at the base station 112. In some embodiments, the base station 112 may monitor and/or measure the quantity and the throughput of UE that is connected to the network 102 at the base station 112 via the first access technology (e.g., current UE via 5G). Additionally, in embodiments, the base station 112 may monitor and/or measure the quantity and the throughput of UE that is connected to the network 102 at the base station 112 via the second access technology (e.g., legacy UE via 4G). The base station 112 may monitor and/or measure the quantity and the throughput of UE that is connected to the network 102 at the base station 112 via the first access technology and that is geographically located in the edge region of a particular sector of the cell site, in an embodiment. The base station 112 may monitor and/or measure the quantity and the throughput of UE that is connected to the network 102 at the base station 112 via the first access technology and that is geographically located in the near-cell region of a particular sector of the cell site, in one embodiment. Accordingly, the base station 112 may monitor and/or measure the quantity and the throughput of UE that is connected to the network 102 at the base station 112 via the first access technology, via the second access technology, that is geographically located in the near-cell region of a particular sector, that is geographically located in the edge region of a particular sector, and/or any combination thereof.

Figure 4:
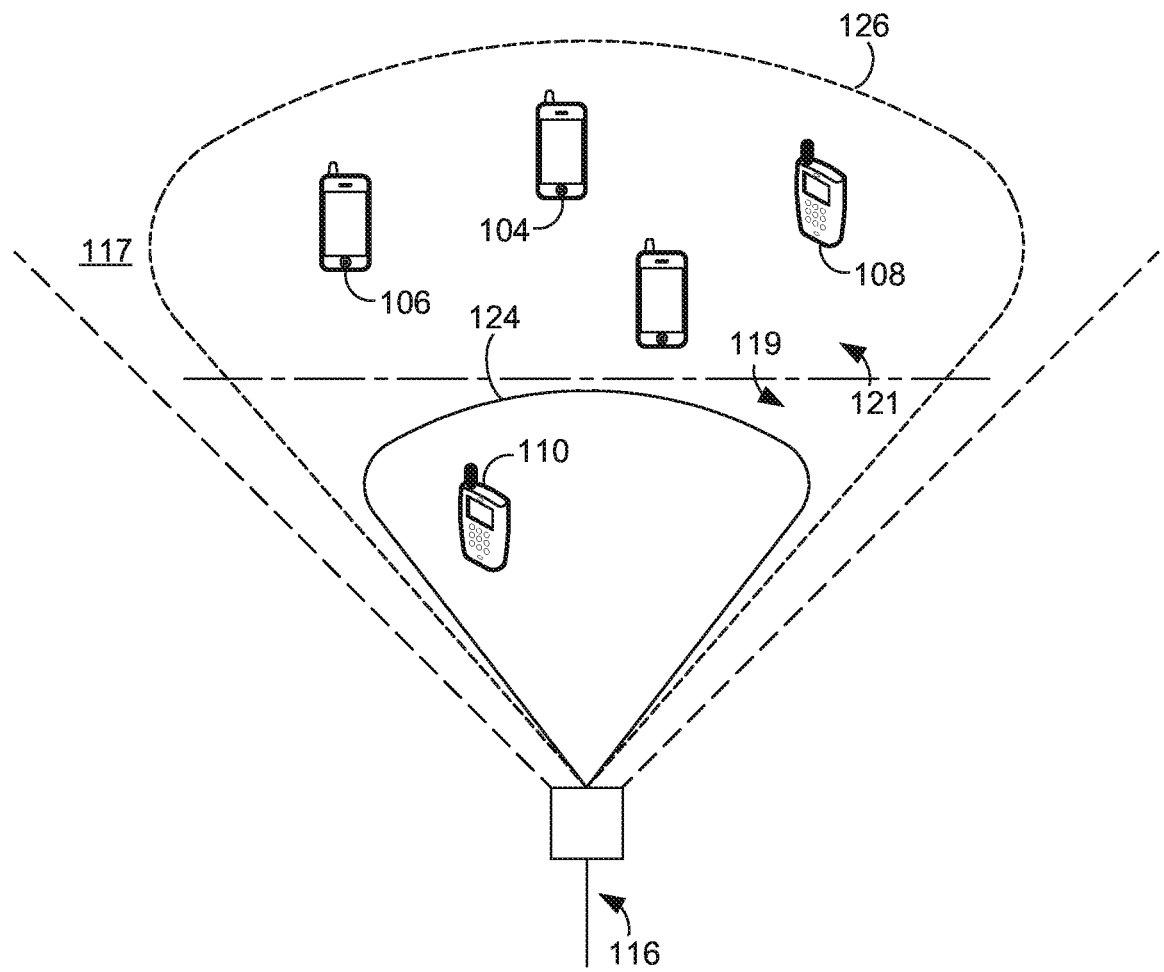
FIG. 4 depicts an example of coverage areas provided by an antenna array in accordance with one or more embodiments.

Based on the quantity of and/or the throughput of UE, the base station 112 may determine to shift at least one of the plurality of UE within the particular sector of the cell site from the first access technology to the second access technology. In embodiments, the base station 112 may reduce the transmission power, partially or completely, of one or more individual antenna elements in the antenna array 116, as described hereinafter. For example, a subset of antenna elements in the first portion of the antenna elements 118A that are dedicated to the first access technology and that provide service to the edge region of a sector may be powered "off" by the base station 112. When supplied with power, this subset of antenna elements radiates and provides a coverage area 124 at the edge region of the cell site, and the coverage area provided corresponds to the first access technology, based on the configuration of the antenna elements in the subset, as shown in FIG. 3, for example. However, after the transmission power reduction and/or after being powered off, the coverage area 124 that provided first access technology service in that edge region of the sector disappears, either partially or completely, as shown in FIG. 4. In this example, one or more UE that are geographically located in the edge region of the sector and that were connected to the subset of antenna elements (i.e., now powered off) via the first access technology may switch to the second access technology by connecting to one or more antenna elements in the second portion of the antenna elements 118B that are dedicated to the second access technology and that provide service to the edge region of the sector. Thus, a quantity of UE can connect to the network 102 using one or more antenna elements in the second portion of the antenna elements 118B that are dedicated to the second access technology and that provide a coverage area 126 that corresponds to the edge region of the sector.

Accordingly, a subset or a first subset of antenna elements (from within the first portion of antenna elements 118A that are dedicated to the first access technology) that provide a coverage area within the sector and/or edge region of the sector may be turned off by reducing, partially or completely, the transmission power of the first subset of antenna elements, as controlled by the base station 112. At the same time or concurrently, a remaining portion of the first portion of antenna elements 118A remain powered and/or stay powered "on," such that the transmission power is not reduced and/or is not modified for those remaining antenna elements, for example. In such an example, the first subset of antenna elements is powered off while the remaining portion of antenna elements is kept powered on. In this example, the transmission power of the second portion of antenna elements 118B that are dedicated to the second access technology is not reduced or is not modified. Thus, a quantity of UE may connect to the network 102 using one or more antenna elements in the second portion of the antenna elements 118B that are dedicated to the second access technology and that provide a coverage area 126 that corresponds to the edge region of the sector.

Having described the network environment 100 and components operating therein, it will be understood by those of ordinary skill in the art that the network environment 100 is but one example of a suitable network and is not intended to limit the scope of use or functionality of the present invention. Similarly, the network environment 100 should not be interpreted as imputing any dependency and/or any requirements with regard to each component and combination(s) of components illustrated in FIGS. 1 through 4. It will be appreciated by those of ordinary skill in the art that the number, interactions, and physical location of components illustrated in FIGS. 1 through 4 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIGS. 1 through 4 for simplicity's sake. As such, the absence of components from FIGS. 1 through 4 should not be interpreted as limiting the present invention to exclude additional components and combination(s) of components. Moreover, though components may be represented as singular components or may be represented in a particular quantity in FIGS. 1 through 4, it will be appreciated that some embodiments may include a plurality of devices and/or components such that FIGS. 1 through 4 should not be considered as limiting the quantity of any device and/or component. Having described the network environment 100, methods are discussed that can be performed within the network environment 100 and using the components discussed in FIGS. 1 through 4.

Figure 5:
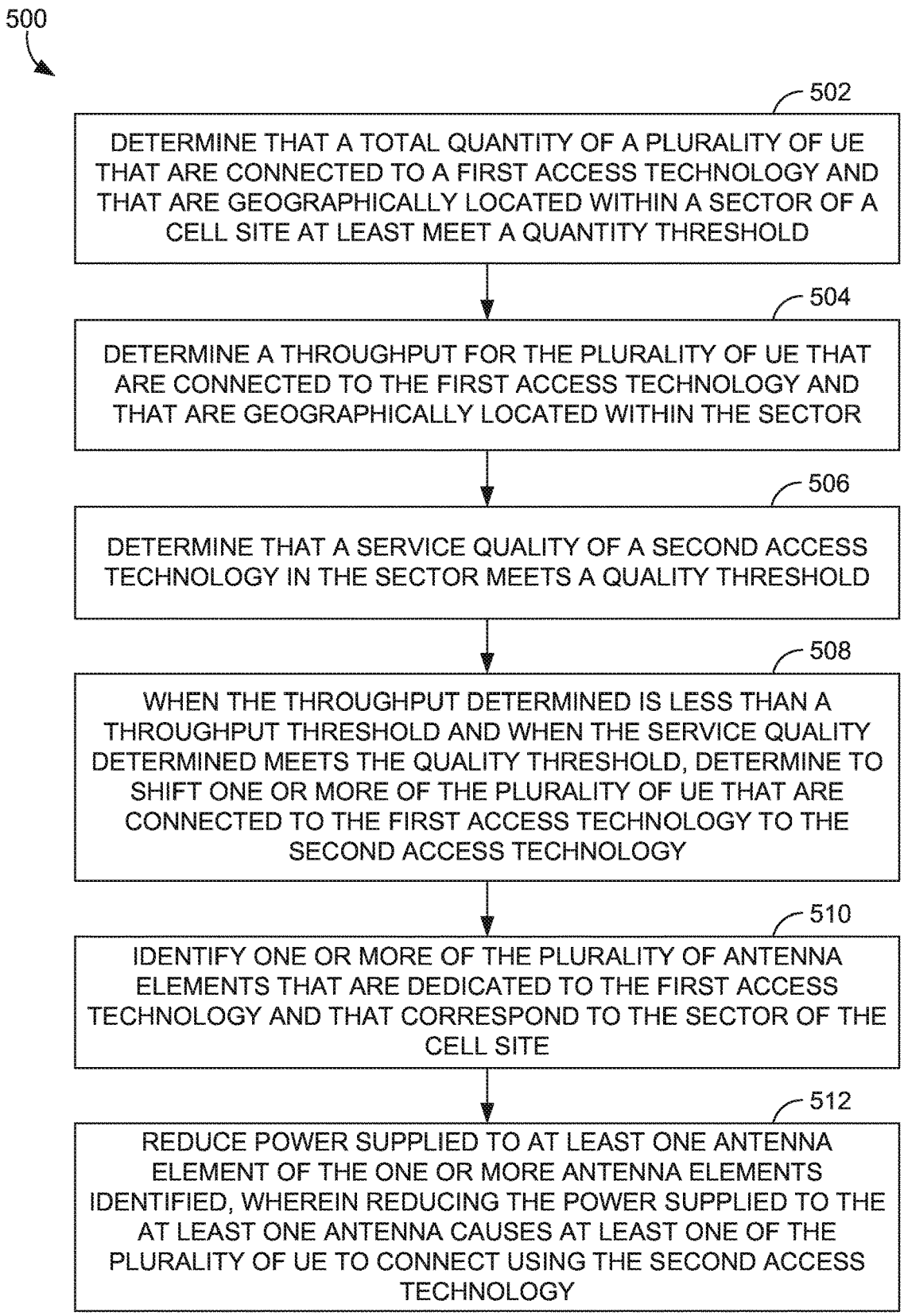
FIG. 5 illustrates an example method for optimizing user experience based on dynamic power modifications in accordance with one or more embodiments.
Figure 6:
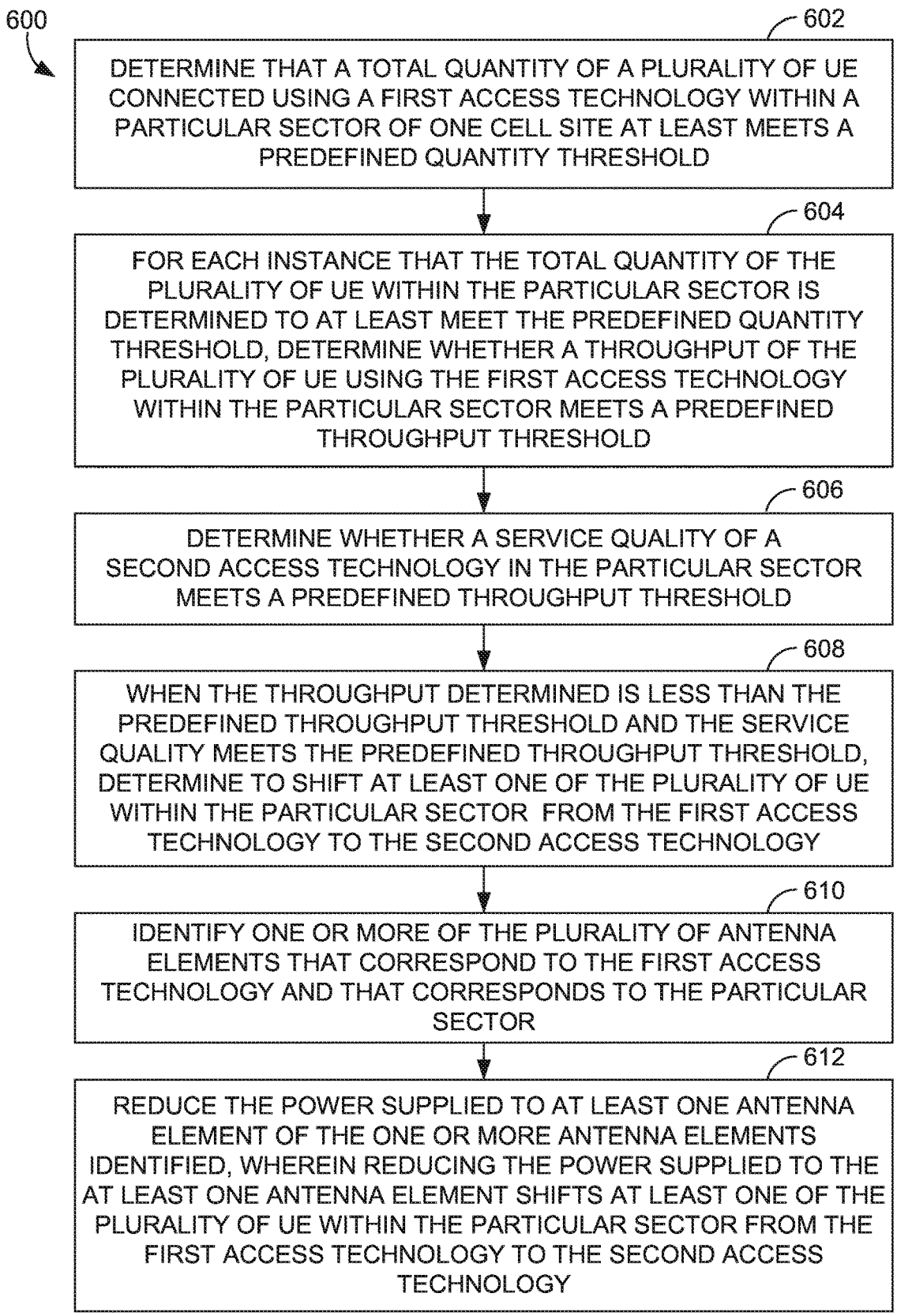
FIG. 6 illustrates another example method for optimizing user experience based on dynamic power modifications in accordance with one or more embodiments.

FIGS. 5 and 6 illustrate examples of methods that may be performed via one or more of the components and component interactions previously described in FIGS. 1 through 4. As such, the methods are discussed briefly, though it will be understood that the previous discussion and details may be applicable to aspects of the methods of FIGS. 5 and 6. Additionally or alternatively, it will be understood that the methods discussed herein can be implemented or performed via the execution of computer-readable instructions stored on computer readable media, by one or more processors.

FIG. 5 provides an example of a method 500 for optimizing an edge-user experience in a first access technology based on dynamic antenna power modifications in accordance with embodiments herein. In embodiments, the method 500 is performed at a base station, for example, such as the base station 112 of FIG. 1. In some embodiments, the base station is associated with a cell site that includes an EN-DC antenna array, wherein the EN-DC antenna concurrently provides concurrent network access through both a first and second access technology. As such, the base station may control the EN-DC antenna array having a plurality of antenna elements, wherein a first subset of antenna elements are dedicated to a first access technology and a second subset of antenna elements are dedicated to a second access technology. It will be understood from this Description that the method 500 may be performed, continually or periodically, for a plurality of sectors and across a plurality of cell sites. Additionally, the method 500 may be performed, continually or periodically, for each of a plurality of sectors within each of a plurality of cell sites, across a global network.

At block 502, a total quantity of a plurality of UE that are connected to a first access technology and that are geographically located within a sector of a cell site is determined to, at least, meet a quantity threshold. In embodiments, the threshold-meeting quantity of UE are currently connected to a network using the first access technology, and are not connected to the network using a second access technology although the UE may be capable of using the second access technology. The threshold quantity may be an integer or other numeric metric that is predetermined and/or predefined by a service provider, an operator, network configurations, device configurations, antenna configurations, base station configurations, and/or any combination thereof, in various embodiments. In some embodiments, the threshold quantity may be predefined and may be specific to the geographic area of the cell site and/or specific sector (e.g., based on population or user density, subscriber density, building density, seasonal changes in user density), the specific type of antenna array, and/or based on historical usage patterns at the cell site. In one embodiment, the threshold quantity is a predefined default number.

In embodiments, the total quantity of UE that are currently connected via the first access technology are counted, and it may be determined whether the total quantity of UE that are currently connected using the first access technology meet or exceed the quantity threshold. For example, the base station may determine how many UE are connected to the network at the cell site using the first access technology, independent of specific sectors. In another example, the base station may determine how many UE are connected to the network at the cell site using the first access technology within a first sector, within a second sector, and so on, at the cell site. In yet another example, the base station may determine how many UE are connected to the network at the cell site using the first access technology within a particular first sector. For example, a base station may determine the number of UEs that are located within the particular sector served by a particular antenna array at the cell site, and further, may determine which of those UEs are currently connected to the network by using the first access technology.

In one embodiment, at least a portion of the threshold-meeting quantity of UE may be geographically located (i.e., determined as a physical location, zip code, GPS coordinates, triangulation) within an edge region of one particular sector of one cell site. The total quantity of the plurality of UE that are connected to the first access technology and that are geographically located within the edge region of one particular sector of the cell site is determined to, at least, meet the quantity threshold. In such an embodiment, a portion or all of the threshold-meeting quantity of UE are connected to a subset of antenna elements that are dedicated to the first access technology and that correspond to the edge region (i.e., the subset of antenna elements radiate in order to create and/or provide a coverage area that includes, at least, the edge region in the sector). In one embodiment, all of the threshold-meeting quantity of UE may be geographically located within one edge region of one sector of the one cell site. Thus, for example, the total quantity of UE that are both currently connected via the first access technology and are geographically located within an edge region of one sector of one cell site may be counted by the base station, and the base station may determine whether the number of counted UE meets or exceeds the quantity threshold. In some embodiments, the base station may not consider, or may otherwise disregard, the number of UE that are connected to the network using the second access technology at the cell site, in a particular sector, and/or in an edge region of a particular sector because those UE are utilizing resources (i.e., antenna elements) allotted to the second access technology.

Continuing to block 504, the throughput is determined for the plurality of UE that are connected to the first access technology and that are geographically located within the sector. The throughput may be determined for the plurality of UE that are connected to the first access technology and that are geographically located within the edge region of the sector, in a further embodiment. In embodiments, the throughput may be an average throughput calculated by measuring the throughput of the plurality of UE. In some embodiments, the throughput is an average throughput calculated using the throughput of each of a portion or all of the plurality of UE that met or exceeded the threshold quantity. The throughput may be calculated and/or determined, in various embodiments, subsequent to, based on, and/or in response to the determination that the threshold quantity was met by the UE that are connected to the first access technology and that are geographically located within the sector, and/or within the edge region of that sector.

For example, the throughput may be determined by calculating an average throughput using the measured and/or reported individual throughputs of all of UE that are both currently connected to the network using 5G technology and are geographically located within the edge region of a particular sector. Each individual throughput or the average throughput may be compared and/or evaluated relative to a throughput threshold, in embodiments, in order to determine whether the throughput meets or exceeds the throughput threshold. The throughput threshold may be an integer or other numeric metric that is predetermined and/or predefined by a service provider, an operator, network configurations, device configurations, antenna configurations, base station configurations, and/or any combination thereof, in various embodiments. In some embodiments, the throughput threshold may be predefined based on the area of the cell site and/or sector (e.g., based on population or user density, subscriber density, building density, seasonal changes in user density), the specific type of antenna array, based on historical usage patterns at the cell site, and/or may be specific to the access technology being used. As an example, a throughput threshold for 5G technology might be defined as a 100 megabits per second (mbps) or more, while a throughput threshold for 4G technology might be defined as less than 100 mbps. In another example, a throughput threshold for 5G technology might be defined as a 5 gigabits per second or more. In one example, a throughput threshold for 5G technology might be defined as a value (e.g., 5 gigabits per second) or a range. In one embodiment, the throughput threshold is specific to the first access technology and defines a minimum throughput value. At a high level, the throughput threshold may be used to recognize or determine whether the user service experience for the plurality of UE currently using the first access technology is degraded, poor, impaired, or compromised. In one example, when a large volume of UE are connected to 5G within an edge region of a sector, the capacity and resources allotted to 5G may be throttled, resulting in lower data rates and poor user services experiences for those UE connected to 5G.

Because the capacity and resources allotted to the first access technology may be throttled due to high volume of UE connected using the first access technology within a sector and/or an edge region of a sector, it may be desirable to improve the user experience by reducing the number of UE connected using the first access technology and pushing some of the UE to operate using the second access technology. As such, in embodiments, the base station may determine whether the service quality of the second access technology in the sector meets a quality threshold prior to taking actions to shift at least a portion of the UE from the first access technology to the second technology, as is described further hereinafter. This may be used to determine that, when shifting one or more UE from the first access technology to the second access technology, the user experience and/or service quality experienced by the one or more shifted UE will not result in a service drop and/or will not result in throttling on the second access technology. Accordingly, the service quality of the second access technology in the sector is determined to, at least, meet a quality threshold, as illustrated at block 506. The service quality of the second access technology may be determined prior to, concurrently with, or subsequent to the throughput determination, in various embodiments.

For example, the base station may determine that the service quality and resources available on 4G in the edge region of the sector is at least sufficient to handle the on loading and/or addition of one or more edge-located UE in the sector that were connected to 5G. In the example, the base station may determine whether the service quality of 4G meets a threshold or minimum, is within a particular range of a signal quality level, and/or that are sufficient resources for 4G allotment available. The base station may examine and determine the service quality as measured at the base station and/or as reported by other UE at the cell site, within one or more sectors, with the same sector as the threshold-meeting quantity of UE, and/or within the same edge region as the threshold-meeting quantity of UE.

Continuing, when the throughput determined is less than the throughput threshold and when the service quality determined meets the quality threshold, a determination is made to shift one or more of the plurality of UE that are connected to the first access technology to the second access technology, as shown at block 508. For example, when the throughput determined is less than a throughput threshold and when the service quality determined meets the quality threshold, the base station may determine that at least one of the edge-located and first-access-technology connected plurality of UE are to be shifted from the first access technology to the second access technology. In further embodiments, when the throughput determined is less than a throughput threshold and when the service quality determined meets the quality threshold, the base station may determine that a plurality of the edge-located and first-access-technology connected UE are to be shifted from the first access technology to the second access technology, in embodiments. In some embodiments, when the first access technology is 5G, the second access technology is non-5G technology. In one embodiment, when the second access technology is 5G, the first access technology is non-5G technology. Alternatively, in some embodiments, a determination is made to shift one or more of the threshold-meeting quantity of UE from the first access technology to the second access technology when the throughput of the threshold-meeting quantity of UE is less than the throughput threshold, independent of the service quality of the second access technology.

At block 510, one or more antenna elements that are dedicated to the first access technology and that correspond to the sector of the cell site are identified. In further embodiments, one or more antenna elements that are dedicated to the first access technology and that correspond to the edge region of the sector of the cell site are identified. The one or more antenna elements may be identified as a plurality of antenna elements that are dedicated to the first access technology and that provide a coverage area corresponding to the sector at the cell site, in embodiments. The one or more antenna elements may be identified, in some embodiments, by determining a subset of such a plurality of antenna elements that are dedicated to the first access technology and that provide a coverage area corresponding to the edge region. In embodiments, one or more antenna elements are selected from the subset of the plurality of antenna elements, for which the transmission power is to be reduced, for example, by reducing the power supplied to the specific subset of antenna elements.

In one example, the base station may identify one or more antenna elements that are dedicated to 5G, and may identify which of said one or more antenna elements specifically radiate and provide a coverage area that corresponds to sector and/or to the edge region in which the threshold-meeting quantity of UE are geographically located that are to be shifted from the first access technology to the second access technology. In an example, looking to FIG. 2, the base station may identify, recognize, or determine that the first portion of antenna elements 118A are dedicated to 5G, and may further identify a subset of one or more antenna elements within the first portion of antenna elements 118A that specifically radiate and provide a coverage area that corresponds to the sector and/or to the edge region in which the threshold-meeting quantity of UE are geographically located that are to be shifted from the first to the second access technology.

The base station may also identify a specific number of antenna elements that for which the transmission power is to be reduced, partially or completely, by reducing the power supplied to that specific number of antenna elements. For example, by identifying a subset of one or more antenna elements within the first portion of antenna elements 118A that specifically radiate and provide a coverage area that corresponds to the sector and/or to the edge region in which the threshold-meeting quantity of UE are geographically located that are to be shifted, the base station may determine that the power supplied to the one or more antenna elements of the subset is to be reduced in order to lower or interrupt their transmission power. The base station may determine that the power supplied to a portion, only a portion, or all of the antenna elements of the subset is to be reduced, in various embodiments. As such, in addition to selectively identifying particular antenna elements that provide service to specific geographic locations in the sector, the base station may determine a number of the elements for which power is to be reduced, in embodiments. In this manner, the base station may calculate a desired power reduction and choose a number of antenna elements that correspond to the calculated power reduction, in embodiments. In some embodiments, the number of antenna elements determined and/or the amount of transmission power to reduce is determined or based on the throughput determined. For example, the number of antenna elements for which power is to be reduced (and transmission power is reduced) may be proportionate to the level or amount by which throughput is below the throughput threshold. In one embodiment, the number of antenna elements for which power is to be reduced is a default number. In another embodiment, the number of antenna elements for which power is a fixed ratio or percentage of the threshold-meeting quantity of UE.

The power supplied to at least one antenna of the one or more antenna elements identified is reduced, as shown at block 512, wherein reducing the power supplied to the at least one antenna causes at least one of the plurality of UE to connect using the second access technology, in embodiments. In embodiments, reducing the power supplied to the at least one antenna element causes at least one of the threshold-meeting quantity of UE to disconnect from the first access technology and then subsequently connect to the second access technology at the same cell site. Partially or completely reducing the transmission power by reducing the transmission power supplied to the at least one antenna element that is dedicated to the first access technology (e.g., 5G) forces at least some portion of edge-located first access technology connected UE to connect using the second access technology (e.g., 4G) instead because the first access technology coverage area in the edge region has been reduced in size and/or at least partially removed relative to the prior power setting(s). By reducing the number of UE that are connected using the first access technology via the power supply/transmission power reduction, the throughput of the UE that are and/or that remain connected to the first access technology may be improved. In one embodiment, reducing the power supplied to the at least one antenna element causes at least one of the threshold-meeting quantity of UE that are geographically located with the edge region of the one sector to disconnect from the first access technology and to connect to the second access technology at the cell site. Thus, reducing the power supplied to at least one antenna element reduces the transmission power of that at least one antenna element, and shifts at least one of the plurality of UE within the particular sector from the first access technology to the second access technology, in embodiments. In one embodiment, the power supplied to the at least one antenna element is reduced by at least 80%. In a further embodiment, the power supplied to the at least one antenna element is reduced by at least 95%. In yet a further embodiment, the power supplied to the at least one antenna element is reduced by at least 98% and/or up to 100%, such that the at least one antenna element is completely or effectively powered "off." Accordingly, in some embodiments, the power supplied to/transmission power of the at least one antenna element is terminated, stopped, or interrupted.

However, the transmission power of at least one other antenna element that is dedicated to the first access technology and that corresponds to the sector and/or the edge region of the sector of the cell site is maintained. Thus, another portion of UE may remain connected to the first access technology within the sector and/or edge region, in embodiments. That portion of UE is predicted to experience improved throughput. At least one UE in the sector and/or within the edge region of the sector remains connected via the first access technology through the at least one other antenna element dedicated to the first access technology for which power was not reduced, even as some antenna elements dedicated to the first access technology were powered down, in various embodiments. The maintenance of the power supplied to one or more other edge-serving first-technology-specific antenna elements within the sector may be based on, in response to, and/or trigger by reducing the power supplied to the at least one antenna element, in an embodiment. Accordingly, subsequent to reducing the power supplied to the at least one antenna element that is dedicated to the first access technology, at least one other UE of the plurality of UE in the sector remains connected to the first access technology via one or more other antenna elements that are dedicated to the first access technology within the edge region of the particular sector and for which the power supplied is not reduced, in embodiments.

FIG. 6 provides an example of a method 600 for optimizing an edge-user experience in a first access technology based on dynamic antenna power modifications in accordance with embodiments herein. In embodiments, the method 600 is performed at a base station, for example, such as the base station 112 of FIG. 1. It will be understood from this Description that the method 600 may be performed for a plurality of sectors and a plurality of cell sites. Additionally, the method 600 may be performed, continually or periodically, for each of a plurality of sectors within each of a plurality of cell sites, across a global network. One or more aspects of the method 600 are discussed with brevity as these aspects have been described in other method(s) and environment(s) previously addressed herein.

Beginning at block 602, a total quantity of a plurality of UE are determined to, at least, meet a predefined quantity threshold. In embodiments, the total quantity of the plurality of UE are connected to a network using a first access technology, and are geographically located within a particular sector of one cell site. In some embodiments, the plurality of UE are geographically located within an edge region of the particular sector, and the plurality of UE are connected to the first access technology using a plurality of antenna elements that are dedicated to the first access technology and that provide a coverage area corresponding to the edge region. The total quantity of UE that are current connected to a network, as located within a particular sector of the cell site, may be determined dynamically (i.e., in near real-time and in an on-going manner) by the base station corresponding to the cell site, in an embodiment. In further embodiments, a total quantity of UE that are current connected to a network, as located within an edge region within a particular sector of a cell site, may be determined dynamically (i.e., in near real-time and in an on-going manner) by the base station corresponding to the cell site, in an embodiments. Accordingly, the base station may determine that the total quantity of UE that are currently connected to an identifiable subset of antenna elements, wherein that identifiable subset of antenna elements specifically provides a coverage area that corresponds to the edge region and are dedicated to the first access technology, in an embodiment. In some embodiments, for each instance when the total quantity of UE being monitored is determined to at least meet the quantity threshold, a throughput determination for the plurality of UE that are geographically located within the sector and/or edge region of the sector may be triggered and/or may be performed in response. In various embodiments, the first access technology may be 5G.

At block 604, for each instance that the total quantity of the plurality of UE within the particular sector is determined to, at least, meet the predefined quantity threshold, it is determined whether a throughput of the plurality of UE using the first access technology within the particular sector meets a predefined throughput threshold. The throughput of edge-located UE that are connected using the first access technology may be measured, individually and/or as a group, in various embodiments. For example, the throughput of each edge-located UE within a particular sector that are connected using the first access technology may be determined, in order to identify a median or to calculate an average throughput for the group of the edge-located UE within a particular sector that are connected using the first access technology.

At block 606, it is determined whether the service quality of the second access technology in the sector meets a quality threshold. The service quality of the second access technology may be determined by the base station using information provided by one or more UE, provided from neighboring cell sites, and/or as measured by the base station itself. As discussed, a base station may monitor one or more of throughput, signal quality metrics (e.g., SINR), a quantity of unique users/subscribers, a quantity of unique UE, and/or radio link failures that occur at the base station, dynamically and/or as stored in a data store. As such, the base station may monitor, measure, and/or determine the signal quality for an antenna array at the cell site using one or more of a variety of metrics. The antenna array may correspond to the particular sector and/or edge region in the particular sector in which the threshold-meeting quantity of UE are geographically located. In some embodiments, the base station may monitor, measure, and/or determine signal quality of a specific portion of antenna elements in an antenna array, such as that portion of antenna elements that are dedicated to the first access technology. Further still, the base station monitor, measure, and/or determine signal quality of a specific subset of portion of antenna elements in an antenna array, such as that subset of antenna elements that are dedicated to the first access technology and that provide a coverage area to the edge region of the particular sector.

Continuing, as illustrated at block 608, when the throughput determined is less than the predefined throughput threshold and the service quality of the second access technology meets the predefined quality threshold, it may be determined that at least one of the plurality of UE within the particular sector is to be shifted from the first access technology to the second access technology. Then, at block 610, one or more antenna elements that correspond to the first access technology and that corresponds to the particular sector is identified. The power supplied to the at least one antenna element of the one or more antenna elements identified is reduced, as illustrated at block 612. In embodiments, reducing the power supplied to the at least one antenna element reduces the transmission power of said antenna element(s) and shifts at least one of the plurality of UE within the particular sector that was connected to the first access technology via the at least one antenna element(s) now powered down to the second access technology, as previously described.

Subsequent to reducing the power supplied to the at least one antenna element, the base station may dynamically monitor a total quantity of UE that are geographically located within the edge region of the sector of the cell site, in some embodiments. In one embodiment, subsequent to reducing the power supplied to the at least one antenna element, the base station may monitor the throughput of at least one of the plurality of UE that remain connected to the first access technology and are geographically located within the sector for a predetermined period of time. Then, in one such embodiment, when the throughput monitored for the predetermined period of time at least meets the throughput threshold, the base station may increase and/or restore the power supplied to at least one antenna element for which the power supplied was previously reduced. By increasing and/or restoring the power supplied to the at least one antenna element for which the power supplied was previously reduced, the transmission power of the at least one antenna element is restored and one or more UE may be on loaded to the first access technology via the at least one antenna element.

Figure 7:
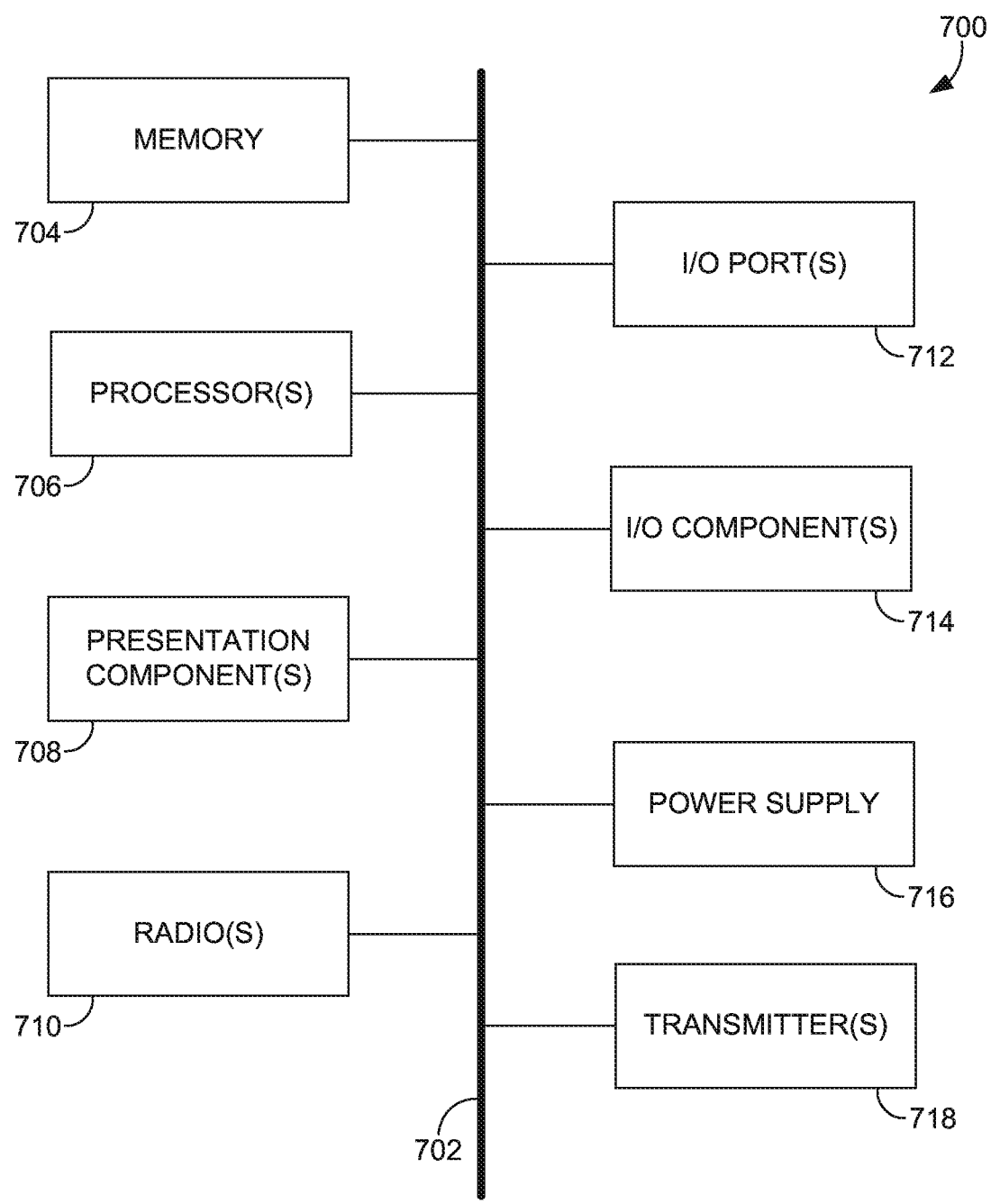
FIG. 7 depicts an example computing device suitable for use in implementations of the present disclosure.

Referring to FIG. 7, a block diagram of an example of a computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated. In aspects, the computing device 700 may be a base station. In another embodiment, the computing device 700 may be UE capable of two-way wireless communications with an access point. Some non-limiting examples of the computing device 700 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 702 that directly or indirectly couples various components together. The bus 702 may directly or indirectly one or more of memory 704, processor(s) 706, presentation component(s) 708 (if applicable), radio(s) 710, input/output (I/O) port(s) 712, input/output (I/O) component(s) 714, power supply 716, and/or transmitter(s) 718. Although the components of FIG. 7 are shown with lines for the sake of clarity, in reality, delineating various components is not so clear, and metaphorically, the lines would more accurately be grey and fuzzy. For example, one may consider a presentation component(s) 708 such as a display device to be one of I/O components 714. Also, the processor(s) 706 may include memory 704, in another example. The present disclosure hereof recognizes that such is the nature of the art, and reiterates that FIG. 7 is merely illustrative of an example of a computing device 700 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 704 may take the form of memory components described herein. Thus, further elaboration will not be provided here, but it should be noted that memory 704 may include any type of tangible medium that is capable of storing information, such as a database or data store. A database or data store may be any collection of records, files, or information encoded as electronic data and stored in memory 704, for example. In one embodiment, memory 704 may include a set of embodied computer-readable and executable instructions that, when executed, facilitate various functions or elements disclosed herein. These embodied instructions will variously be referred to as "instructions" or an "application" for short.

Processor(s) 706 may be multiple processors that receive instructions and process them accordingly. Presentation component(s) 708, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 710 represents one or more radios that facilitate communication with a wireless telecommunications network. For example, radio(s) 710 may be connected to one or more antenna elements through a physical path. Illustrative wireless telecommunications technologies include CDMA, GPRS, TDMA, GSM, and the like. Radio(s) 710 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 710 can be configured to concurrently support multiple technologies, as previously discussed herein. As such, each of many radio(s) 710 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 712 may take a variety of forms. Exemplary I/O ports 712 may include a USB jack, a stereo jack, an infrared port, a firewire port, other proprietary communications ports, and the like. Input/output (I/O) components 714 may comprise keyboards, microphones, speakers, touchscreens, and/or any other item usable to directly or indirectly input data into the computing device 700.

Power supply 716 may include batteries, fuel cells, and/or any other component that may act as a power source to supply power to the computing device 700 or to other network components, including through one or more electrical connections or couplings. Power supply 716 may be configured to selectively supply power to different components independently and/or concurrently.

Finally, regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

It is noted that embodiments of the present invention described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of optimizing an edge-user experience based on dynamic power modifications, the method comprising:
determining that a total quantity of user equipment (UE) connected using a first access technology at a cell site meet a threshold quantity;
determining whether a throughput for the threshold quantity of UE at the cell site meets a throughput threshold;
when the throughput for the threshold quantity of UE is less than the throughput threshold, determining to shift one or more of the threshold quantity of UE from the first access technology to a second access technology; and
reducing power supplied to at least one antenna element of a plurality of antenna elements that correspond to the first access technology, wherein reducing the power supplied to the at least one antenna element causes at least one of the one or more of the threshold quantity of UE to disconnect from the first access technology and to connect to the second access technology at the cell site.

2. The method of claim 1, wherein when the first access technology is 5G, the second access technology is non-5G technology, and wherein when the second access technology is 5G, the first access technology is non-5G technology.

3. The method of claim 1, wherein the threshold quantity of UE are connected to a wireless network using the first access technology.

4. The method of claim 1, wherein all of the threshold quantity of UE are geographically located within an edge region of one sector of one cell site.

5. The method of claim 4, wherein reducing the power supplied to the at least one antenna element causes the one or more of the threshold quantity of UE that are geographically located with the edge region of the one sector to disconnect from the first access technology and to connect to the second access technology at the cell site.

6. The method of claim 1, wherein the power supplied to the at least one antenna element is reduced by at least 80%.

7. The method of claim 1, wherein the power supplied to the at least one antenna element is reduced by at least 95%.

8. The method of claim 1, wherein the power supplied to the at least one antenna element is terminated.

9. Computer-readable storage media having computer-executable instructions embodied thereon that, when executed by one or more processors, cause the processors to:
determine that a total quantity of a plurality of user equipment (UE) that are connected to a first access technology and that are geographically located within a sector of a cell site at least meet a quantity threshold;
determine a throughput for the plurality of UE that are connected to the first access technology and that are geographically located within the sector;
determine that a service quality of a second access technology in the sector meets a quality threshold;
when the throughput determined is less than a throughput threshold and when the service quality determined meets the quality threshold, determine to shift one or more of the plurality of UE that are connected to the first access technology to the second access technology;

identify one or more of a plurality of antenna elements that are dedicated to the first access technology and that correspond to the sector of the cell site; and reduce power supplied to at least one antenna element of the one or more antenna elements identified, wherein reducing the power supplied to the at least one antenna element causes at least one of the plurality of UE to connect using the second access technology.

10. The media of claim 9, wherein the plurality of UE are geographically located within an edge region of the sector, and wherein the plurality of UE are connected to the first access technology using a plurality of antenna elements that are dedicated to the first access technology and that provide a coverage area corresponding to the edge region.

11. The media of claim 9, further causing the one or more processors to, prior to reducing the power supplied to the at least one antenna element:

dynamically monitor a total quantity of UE that are geographically located within an edge region of the sector of the one cell site; and for each instance when the total quantity of UE monitored at least meets the quantity threshold, trigger a throughput determination for the plurality of UE that are geographically located within the edge region of the sector.

12. The media of claim 9, further causing the one or more processors to, subsequent to reducing the power supplied to the at least one antenna element:

dynamically monitor a total quantity of UE that are geographically located within an edge region of the sector of the cell site.

13. The media of claim 9, further causing the one or more processors to, subsequent to reducing the power supplied to the at least one antenna element:

monitor the throughput of at least one of the plurality of UE that remain connected to the first access technology and are geographically located within the sector for a predetermined period of time; and when the throughput monitored for the predetermined period of time at least meets the throughput threshold, increase the power supplied to at least one antenna element for which the power supplied was previously reduced.

14. The media of claim 9, further causing the one or more processors to maintain the power supplied to at least one other antenna element that is dedicated to the first access technology and that corresponds to the sector of the cell site in response to reducing the power supplied to the at least one antenna element.

15. The media of claim 9, wherein subsequent to reducing the power supplied to the at least one antenna element that is dedicated to the first access technology, at least one other UE of the plurality of UE in the sector remains connected to the first access technology via another antenna element that is dedicated to the first access technology and for which the power supplied is not reduced.

16. The media of claim 9, wherein the service quality of the second access technology in the sector is determined in response to determining that the throughput for the plurality of UE is less than the throughput threshold.

17. The media of claim 9, wherein causing the one or more processors to identify the one or more antenna elements dedicated to the first access technology within the sector comprises:

identifying a plurality of antenna elements that are dedicated to the first access technology and that provide a coverage area corresponding to the sector at the cell site;

determining a subset of the plurality of antenna elements that are dedicated to the first access technology and that provide the coverage area corresponding to an edge region of the sector at the cell site; and selecting the one or more antenna elements from the subset, for which the power supplied is to be reduced.

18. The media of claim 9, wherein the cell site comprises an Evolved-Universal Terrestrial Radio Access-New Radio Dual Connectivity (EN-DC) antenna that concurrently provides network access through a first and second access technology, wherein the EN-DC antenna includes a plurality of antenna elements, wherein the plurality of antenna elements comprises a first subset of antenna elements that are dedicated to the first access technology, and wherein the plurality of antenna elements comprises a second subset of antenna elements that are dedicated to the second access technology.

19. A system for optimizing an edge-user experience based on dynamic power modifications, the system comprising:

one or more hardware processors that:

determine that a total quantity of a plurality of user equipment (UE) connected using a first access technology within a particular sector of one cell site at least meets a predefined quantity threshold;

for each instance that the total quantity of the plurality of UE within the particular sector is determined to at least meet the predefined quantity threshold, determine whether a throughput of the plurality of UE using the first access technology within the particular sector meets a predefined throughput threshold;

determine whether a service quality of a second access technology in the particular sector meets the predefined throughput threshold;

when the throughput determined is less than the predefined throughput threshold and the service quality meets the predefined throughput threshold, determining to shift at least one of the plurality of UE within the particular sector from the first access technology to the second access technology;

identifying one or more of a plurality of antenna elements that correspond to the first access technology and that correspond to the particular sector; and reducing power supplied to at least one antenna element of the one or more antenna elements identified, wherein reducing the power supplied to the at least one antenna element shifts at least one of the plurality of UE within the particular sector from the first access technology to the second access technology.

* * * * *